United States Patent
Andersen et al.

(10) Patent No.: US 11,331,651 B2
(45) Date of Patent: May 17, 2022

(54) THREE-WAY CATALYST

(71) Applicant: UMICORE AG & CO. KG, Hanau-Wolfgang (DE)

(72) Inventors: Ryan J. Andersen, Owasso, OK (US); John G. Nunan, Tulsa, OK (US); Curt M. Ellis, Bixby, OK (US); Geon Seog Son, Koenigstein (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 513 days.

(21) Appl. No.: 16/123,211

(22) Filed: Sep. 6, 2018

(65) Prior Publication Data

US 2020/0078769 A1 Mar. 12, 2020

(51) Int. Cl.
*B01J 23/42* (2006.01)
*B01J 21/04* (2006.01)
(Continued)

(52) U.S. Cl.
CPC .............. *B01J 23/42* (2013.01); *B01J 21/04* (2013.01); *B01J 21/063* (2013.01); *B01J 21/066* (2013.01);
(Continued)

(58) Field of Classification Search
CPC . B01J 23/42; B01J 21/04; B01J 21/063; B01J 21/066; B01J 21/08; B01J 21/10;
(Continued)

(56) References Cited

U.S. PATENT DOCUMENTS

| | | | |
|---|---|---|---|
| 6,375,910 B1 * | 4/2002 | Deeba | B01D 53/9422 423/239.1 |
| 2001/0026838 A1 * | 10/2001 | Dettling | B01J 23/63 427/230 |

(Continued)

OTHER PUBLICATIONS

DIN 66132:Bestimmung der spezifischen Oberfläche von Feststof Stickstoffadsorption; Einpunkt-Differenzverfahren nach Haul und Dümbgen. [Determination of specific surface area of solids by adsorption of nitrogen single-point differential method according to Haul and Dümbgen.] Deutsches Institut Fur Normung E. V. [German National Standard], 1975. 5 pages in German (with English machine translation).

*Primary Examiner* — Patricia L. Hailey
*Assistant Examiner* — Michael Forrest
(74) *Attorney, Agent, or Firm* — Smith, Gambrell & Russell, LLP

(57) ABSTRACT

The present invention relates to a catalyst comprising a carrier substrate of the length L extending between substrate ends a and b and three washcoat zones A, B and C wherein washcoat zone A comprises one or more first platinum group metals and extends starting from substrate end a over a part of the length L, washcoat zone C comprises one or more first platinum group metals and extends starting from substrate end b over a part of the length L, and washcoat zone B comprises the same components as washcoat zone A and in addition, one or more second platinum group metals and extends between washcoat zones A and C, wherein $L=L_A+L_B+L_C$, wherein $L_A$ is the length of washcoat zone A, $L_B$ is the length of substrate length B and $L_C$ is the length of substrate length C.

21 Claims, 3 Drawing Sheets

(51) Int. Cl.
 B01J 21/06 (2006.01)
 B01J 21/08 (2006.01)
 B01J 21/10 (2006.01)
 B01J 23/44 (2006.01)
 B01J 23/46 (2006.01)
 F01N 3/035 (2006.01)
 F01N 3/10 (2006.01)

(52) U.S. Cl.
 CPC ............... *B01J 21/08* (2013.01); *B01J 21/10* (2013.01); *B01J 23/44* (2013.01); *B01J 23/464* (2013.01); *F01N 3/035* (2013.01); *F01N 3/101* (2013.01); *F01N 2570/12* (2013.01); *F01N 2570/14* (2013.01)

(58) Field of Classification Search
 CPC ......... B01J 23/44; B01J 23/464; F01N 3/035; F01N 3/101
 See application file for complete search history.

(56) References Cited

U.S. PATENT DOCUMENTS

| | | | |
|---|---|---|---|
| 2004/0001781 A1* | 1/2004 | Kumar | B01J 23/44 422/180 |
| 2006/0029526 A1* | 2/2006 | Watanabe | B01D 46/0001 422/177 |
| 2008/0020922 A1* | 1/2008 | Li | B01J 23/63 502/73 |
| 2015/0033715 A1* | 2/2015 | Markatou | B01D 53/944 60/299 |

* cited by examiner

THREE-WAY CATALYST

The present invention relates to a three-way catalyst (TWC) for treatment of exhaust gases of combustion engines operated with a predominantly stoichiometric air/fuel ratio, It is well known in the field of combustion engines that fuel combustion is not complete and as a result gives emissions of pollutants like unburned hydrocarbons (HC), carbon monoxide (CO), nitrogen oxides ($NO_x$) and particulate matter (PM). In order to improve air quality, emission limit legislations are in place to achieve lower emissions of pollutants from stationary applications and from mobile sources. For mobile sources like passenger cars, the implementation of active strategies such as improved combustion and optimized A/F or lambda control have been carried out in an effort to decrease the emission of pollutants. Improvement of fuel-air mixing (A/F ratio) as a primary measure yielded considerable diminution of pollutants. However, due to more stringent legislations over the years, the use of heterogeneous catalysts has been made inevitable.

For gasoline engines, so-called three-way catalysts (TWC) enable the elimination of HC, CO and $NO_x$. Such catalysts contain catalytically active material consisting of one or more platinum group metals, in particular platinum, palladium and/or rhodium.

Maximum conversion for CO, HC and NOx by the TWC catalyst is around Lambda=1+/−0.005 where the air/fuel ratio is equal to about 14.56. Above these values, the exhaust gas is said to be lean and contains an excess of oxidants such as $O_2$ and $NO_x$, and CO and HC are catalytically oxidized to carbon dioxide and water. Below this value, the exhaust gas is said to be rich and contains an excess of reductants such as $H_2$, CO and HCs and mainly $NO_x$ is reduced to nitrogen using e.g. CO as a reducing agent. While maximum conversion of HC, CO and $NO_x$ is achieved at Lambda=1, gasoline engines operate under continually oscillating conditions between slightly lean and slightly rich conditions, In order to broaden the optimal operation of a TWC, oxygen storage components ((FSCs) in the form of cerium-zirconium mixed oxides are included in its formulation.

Highly concentrated platinum group metals (PGMs) like platinum, palladium and rhodium, can give significant performance improvements in many exhaust after-treatment applications. Thus, in the case of palladium, the light-off performance can be improved by 100° C. (measured as temperature for 50% conversion) by increasing the Pd load from 20 g/ft$^3$ (0.7 g/l) to higher loadings of 100 g/ft$^3$ (3.5 g/l) after moderate to severe aging. Performance does improve above these loadings but the performance gradient with respect to palladium loading is low and very high palladium loads are required for an appreciable impact. The same general trend is expected for rhodium in TWC applications.

However, high concentrations of platinum group metals in three-way conversion catalysts are not favored because of their high cost. This drawback can be partially overcome by strategic placement in small size monoliths with high cell density located close to the engine manifold. This strategy takes advantage of hotter exhaust gas temperatures that shorten the time for cold start as the monolith heats faster. The lower mass coupled with high cell density takes advantage of lower thermal inertia coupled with faster heat transfer to the close coupled (CC) monolith.

A further strategy for improved light-off and for lowering platinum group metal cost is to selectively locate it on a small section of the monolith, often less than 10% of the monolith volume where it has the greatest benefit. This allows us to concentrate the platinum group metal while not using a large quantity.

It is known in the literature that highly concentrated and short zones of platinum group metals, when applied to the substrate inlet, give improved cold start performance due to improved light-off, especially for hydrocarbon (HC) oxidation as high concentrations of HC are emitted when the engine is cool and combustion is incomplete. However, the close coupled monolith can be exposed to a variety of contaminants that remain in place over the lifetime of the vehicle. These include the break-down of partially combusted components from engine oil and include calcium, phosphorous, zinc and boron. These poisons are not deposited uniformly over the length of the monolith but are deposited preferentially towards the inlet of the catalyst and their concentration drops off rapidly as we progress towards the monolith outlet. The fall-off in concentration can be exponential in nature such that the front one to two inches of the monolith can have very high loadings of these components. Depending on how the poisons enter the exhaust two different types of poisoning modes are observed. If the poisons leak into the vehicle combustion chamber the resultant phosphorous and zinc penetrates the washcoat located on the monolith and reacts with its components such as cerium and aluminum. It is believed that phosphorous forms phosphoric acid in this poisoning mechanism and is reactive to such an extent that the normally structurally stable Ce—Zr mixed oxides are broken down to give new compounds. In extreme cases, the cerium can be extracted from the Ce—Zr mixed oxides to give $CePO_4$ which results in a loss of OSC performance.

In a second mechanism, the engine oil can leak directly into the exhaust after it exits the combustion cylinders. In this case the oil is deposited directly onto the monolith washcoat and decomposes to give zinc pyrophosphate on the surface. If high levels are deposited via this mechanism a surface "glaze" or impermeable barrier on the washcoat surface is formed such that exhaust gas molecules are unable to diffuse to the active platinum group metal component within the washcoat. This is often referred to as masking and is commonly observed for severely oil-poisoned TWC catalysts. A consequence of this type of poisoning is that selective placement of the platinum group metal band or zone at the inlet face of the monolith would be counterproductive as a high fraction of the expensive platinum group metal is not available for catalysis.

Other poisoning mechanisms that selectively target the inlet region of the monolith include washcoat erosion and physical blockage and coating of the washcoat if the inlet face is impacted with particulate matter such as rust originating from the manifold region. In some regions of the world such as China, the inclusion of the octane booster Methyl-cyclo-pentadienyl manganese tri-carbonyl (MMT) can decompose on the inlet monolith region to give a layer of $Mn_3O_4$ which again can act as a physical masking or blocking reagent for exhaust gases that must penetrate to the washcoat for catalysis to occur.

The inventors of the present invention discussed whether the above disadvantages of zoning (also called banding) the inlet region of the monolith with high platinum group metal concentrations can be overcome by locating the high platinum group metal zone sufficiently away or back from the inlet region of the monolith such that the above poisoning and deactivation mechanisms are minimized while still achieving the advantage of improved light off and subsequent shorter cold start periods on the vehicle.

In many applications the close coupled monoliths can be long, up to 4-6" long. In these type applications the inventors unexpectedly found that a palladium zone can be beneficially and selectively located one to four inches back from the inlet face so as to benefit from the advantages of the high palladium concentration zone for improved light-off while at the same time avoiding the disadvantages of the palladium zone being covered or deactivated by the decomposition products of oil, rust or other contaminants such as MMT-derived deposits. This design leads to measurable performance advantages as compared to zoning the inlet or using a homogeneous platinum group metal distribution across the full volume of the monolith. Part of the explanation may arise from the selective poisoning of the inlet as described above coupled with the special characteristics (smaller volumes, shorter parts, lower mass and higher cell density) of current CC-1 monoliths.

The present invention pertains to a catalyst comprising a carrier substrate of the length L extending between substrate ends a and b and three washcoat zones A, B and C, wherein washcoat zone A comprises one or more first platinum group metals and extends starting from substrate end a over a part of the length L, washcoat zone C comprises one or more first platinum group metals and extends starting from substrate end b over a part of the length L, and washcoat zone B comprises the same components as washcoat zone A and in addition one or more second platinum group metals and extends between washcoat zones A and C, wherein $L = L_A + L_B + L_C$, wherein $L_A$ is the length of washcoat zone A, $L_B$ is the length of washcoat zone B and $L_C$ is the length of washcoat zone C.

Accordingly, washcoat zone A extends starting from substrate end a over a part of the length L, washcoat zone B follows washcoat zone A and extends over a part of the length L and washcoat zone C follows washcoat zone B and extends until substrate end b while there is no or substantially no overlapping of the washcoat zones.

In particular, washcoat zone B comprises the same components as washcoat zone A in the same amounts as washcoat zone A.

In a preferred embodiment of the present invention, washcoat zones A and C are identical and comprise the same components in the same amounts. In this case the one or more first platinum group metals are distributed uniformly through the full length L of the carrier substrate, whereas the one or more second platinum group metals are present in washcoat zone B only. This further means that the total amount of platinum group metal in washcoat zone B is higher than the total amount of platinum group metal in washcoat zones A and C, respectively.

First and second platinum group metals can be the same or can be different but are independent from each other. For example, the first platinum group metal is platinum, palladium and/or rhodium and the second platinum group metal is platinum, palladium and/or rhodium. Preferably, the first platinum group metal is palladium and rhodium and the second platinum group metal is palladium or the first platinum group metal is palladium and rhodium and the second platinum group metal is rhodium. In a further embodiment, the first platinum group metal is palladium and rhodium and the second platinum group metal is platinum.

The second platinum group metal can also be platinum and palladium, platinum and rhodium or palladium and rhodium.

In case first and second platinum group metals are both the same, for example palladium, washcoat zone B comprises a higher amount of that platinum group metal, for example palladium, than washcoat zones A and C.

In an embodiment of the present invention washcoat zone A comprises two washcoat zones A1 and A2, which both extend over the length $L_A$, wherein washcoat zone A1 comprises one or more first platinum group metals and washcoat zone A2 comprises one or more first platinum group metals different from the one or more first platinum group metals of washcoat zone A1, washcoat zone C comprises two washcoat zones C1 and C2, which both extend over the length $L_C$, wherein washcoat zone C1 comprises one or more first platinum group metals and washcoat zone C2 comprises one or more first platinum group metals different from the first one or more platinum group metals of washcoat zone C1, and washcoat zone B comprises two washcoat zones B1 and B2, which both extend over the length $L_B$, wherein washcoat zone B1 comprises the same components as washcoat zone A1 and washcoat zone B2 comprises the same components as washcoat zone A2 and wherein washcoat zones B1 and B2 comprise in addition one or more second platinum group metals.

In embodiments of the present invention, washcoat zone A2 covers washcoat zone A1, washcoat zone B2 covers washcoat zone B1 and/or washcoat zone C2 covers washcoat zone C1.

In embodiments of the present invention washcoat zone A1 comprises palladium or comprises palladium and one or more additional platinum group metals, in particular platinum and rhodium, preferably rhodium and washcoat zone A2 comprises rhodium or comprises rhodium and one or more additional platinum group metals, in particular platinum and palladium, preferably palladium.

Preferably, the first platinum group metal in washcoat zone A1 is palladium and the first platinum group metal in washcoat zone zone A2 is rhodium. In that case the weight ratio Pd:Rh is, for example, from 10:1 to 1:10.

Similarly, washcoat zone C1 comprises palladium or comprises palladium and one or more additional platinum group metals, in particular platinum and rhodium, preferably rhodium and washcoat zone C2 comprises rhodium or comprises rhodium and one or more additional platinum group metals, in particular platinum and palladium, preferably palladium.

Preferably, the first platinum group metal in washcoat zone C1 is palladium and the first platinum group metal in washcoat zone C2 is rhodium. In that case the weight ratio Pd:Rh is, for example, from 10:1 to 1:10.

It is preferable, that washcoat zones A1 and C1 and washcoat zones A2 and C2, respectively, are identical and comprise the same components in the same amounts.

In preferred embodiments of the present invention washcoat zones A, B and C are, apart from the presence of the second platinum group metal in washcoat zone B, identical and comprise the same components in the same amounts.

Likewise, washcoat zones A1, B1 and C1 are, apart from the presence of the second platinum group metal in washcoat zone B1, identical and washcoat zones A2, B2 and C2 are, apart from second platinum group metal in washcoat zone B2, identical and comprise the same components in the same amounts.

If in that case, the platinum group metal in washcoat zone A and A1, respectively, and in washcoat zone C and C1, respectively, comprises palladium, it is usually present in an amount of 0.04 to 4.0 g/l, based on the zone volume of the carrier substrate and calculated as palladium metal.

The palladium content in washcoat zone B and B1 respectively, is in that case usually 2 to 30 g/l, based on the volume of the carrier substrate and calculated as palladium metal.

In case the platinum group metal in washcoat zone A and A1, respectively, comprises rhodium, it is usually present in an amount of 0.04 to 4.0 g/l, based on the zone volume of the carrier substrate and calculated as rhodium metal. The same applies to washcoat zone C and C1, respectively.

Preferably, first and second platinum group metals are independently from each other supported on a carrier material.

As carrier material all materials can be used which are known to the skilled person for that purpose. Usually, they have a BET surface area of 30 to 250 m$^2$/g, preferably of 100 to 200 m$^2$/g (determined according to German standard DIN 66132) and are in particular selected from the group consisting of alumina, silica, magnesia, titania, zirconia, ceria, mixtures comprising at least one of these materials and mixed oxides comprising at least one of these materials.

Preferred are alumina, alumina/silica mixed oxides, magnesia/alumina mixed oxides, ceria, ceria/zirconia mixed oxides and zeolites.

In case alumina is used, it is preferably stabilized, for example with 1 to 10 weight percent, in particular 1 to 4 weight percent, of lanthana.

The different platinum group metals can be supported on the same or on different support materials.

In embodiments of the present invention, washcoat zone A extends over 15 to 50% of the length L of the carrier substrate, preferably 20 to 40%, washcoat zone B extends over 7 to 30% of the length L of the carrier substrate, preferably 15 to 25% and washcoat zone C extends over 20 to 78% of the length L of the carrier substrate, preferably 35 to 65%.

In embodiments of the present invention, the carrier substrate of the length L can be a flow through or a filter substrate. Such carrier substrates are usually made of cordierite, metal or fibrous material and are described in literature and available on the market.

The catalyst of the present invention in which washcoat zones A and C are identical can be manufactured by known methods, in particular by a four-step process which comprises coating of the carrier substrate with a coating suspension (washcoat) which contains the components of washcoat zone A over its entire length L, applying a hydrophobic masking zone extending from substrate end a over the length $L_A$, dipping the coated carrier substrate in an aqueous solution containing a water-soluble compound of the second platinum group metal starting from substrate end a until the length $L_A+L_B$, so as to form washcoat zone B and drying and heating the coated carrier substrate so as to remove the masking zone.

The coating in the first step is usually performed via conventional immersion, suction and pumping methods which are extensively described in the literature and known to the person of skill in the art.

In the second step the hydrophobic masking zone can be applied using a number of approaches.

In one approach a wax or viscous oil can be utilized with a melting point just above room temperature and which has a low viscosity on melting allowing us to push the melted wax into the monolith using a piston type coater and removing excess with piston retraction so as to give cleared channels with a residual layer of wax or viscous oil on the washcoat surface. The zone length can be controlled precisely by the length of the piston stroke. A number of wax types can be utilized such as Paraffin wax which can be derived from petroleum, coal or oil shale. Other types of waxes or viscous oils can be synthesized from ethylene polymerization or polymerization of propylene. Waxes or viscous oils typically consist of a range of hydrocarbons ranging in carbon number from 20 to 70 carbon atoms with alkane components predominating. However, they can also contain a range of functional groups such as fatty acids, primary and secondary long chain alcohols, unsaturated bonds, aromatics, amides, ketones and fatty acid esters.

The melting temperature of waxes can be controlled both by the carbon numbers in the chains or by control of branching, and the presence of the functional groups mentioned above. Typically, a wax is needed that melts just above room temperature such as paraffin wax which melts at about 37° C. (99° F.) and has a boiling point above 370° C. Other waxes or oils include naturally derived products such as coconut oil, cocoa butter or others with the appropriate viscosity and melting temperature.

An alternative approach is to use a wax emulsion of high solids content. This approach eliminates the need to heat the wax or oil to get the appropriate viscosity and fluidity. After application of the emulsion the part can be heated for a short period to melt and spread the wax on the washcoat surface to form a continuous hydrophobic layer over the washcoat.

Waxes and wax emulsions which can be used in the inventive process are known to the skilled person and are available in the market place.

The water-soluble compound of the second platinum group metal used in the third step can be any stable platinum group metal salt inclusive of nitrates, acetates, chlorides, sulfites, amine complexes etc. It is preferable that the solution be neutral or close to neutral and non-corrosive such as an acetate salt like palladium tetra-amine acetate. Since wicking of a solvent such as water occurs after contacting the platinum group metal solution with the washcoat in the substrate channels, a surfactant or surface tension modifier usually needs to be added to control this phenomenon as without it the band length cannot be controlled.

The preferred method of applying washcoat zone B is using a precision piston coater where the exact length of the hydrophobic masking zone and the zone to be contacted with the platinum group metal solution are known. Since the application of the high concentration washcoat zone B is done after application of the washcoat layer the process is very flexible and not technology-specific with respect to washcoat composition or the number of washcoat passes.

The solution of the second platinum group metal traverses over the masking zone without the platinum group metal being adsorbed while adsorption only occurs on the zone of washcoat beyond the masking zone. This zone length can be easily determined and controlled by knowing the length of the masking zone.

The fourth step comprises drying the coated substrate and heating it up to a temperature where the hydrophobic masking zone is completely burned off. These temperatures are usually between 400 and 600° C.

The first to fourth steps are usually followed by calcination and optionally thermal reduction in an atmosphere which contains forming gas.

The catalyst of the present invention is suitable for the treatment of exhaust gases of engines operated with a predominantly stoichiometric air/fuel ratio, the treatment of the exhaust gas being carried out by passing the exhaust gas over the inventive catalyst. In particular, it can be advantageously used in close-coupled position, preferable as the first catalyst located directly after the exhaust manifold (so-called CC-1 position).

Accordingly, the present invention further relates to a method for treating the exhaust gas of an engine operated with a predominantly stoichiometric air/fuel ratio, characterized in that the exhaust gas is passed over an inventive catalyst wherein it enters the catalyst at substrate end a and exits it at substrate end b.

In a preferred embodiment of this method, the inventive catalyst is arranged in close coupled position in particular directly following the exhaust manifold.

The catalyst of the present invention can be combined with another three-way catalyst, a gasoline particulate filter, a HC trap and/or a $NO_x$ trap to form a three-way catalyst system.

For example, substrate end b of the catalyst of the present invention can be followed by a conventional three-way catalyst.

Also, substrate end b of the catalyst of the present invention can follow a conventional three-way catalyst.

As conventional three-way catalysts all three-way catalysts known to the skilled person and described in the literature can be used. Usually they comprise a platinum group metal, in particular palladium and rhodium, supported on a carrier material, as well as an oxygen storing component (CSC) which is in particular a cerium-zirconium mixed oxide.

In addition to using the catalyst of the present invention for the treatment of exhaust gases of engines operated with a predominantly stoichiometric air/fuel ratio, it can also be used as a diesel oxidation catalyst for the treatment of exhaust gases emitted from a lean burn engine, like diesel engines.

Accordingly, the present invention further relates to a method for treating the exhaust gas of a lean-burn engine, characterized in that the exhaust gas is passed over an inventive catalyst wherein it enters the catalyst at substrate end a and exits it at substrate end b.

When used as a diesel oxidation catalyst, the catalyst of the present invention can be combined with other components of a catalyst system for the treatment of learn burn exhaust gases. Examples of such components are active NOx storage catalysts, passive $NO_x$ storage catalysts, diesel particle filters and SCR catalysts.

FIG. 1 illustrates catalysts according to the present invention. The upper part of the figure shows a detail of an inventive catalyst (1) which comprises a carrier substrate (3) which extends between substrate ends a and b and which carries washcoat zone A (4), washcoat zone B (5) and washcoat zone C (6).

The lower part of the figure shows a detail of another embodiment of the invention. Catalyst (2) comprises a carrier substrate (3) which extends between substrate ends a and b. Washcoat zone A comprises washcoat zone A1 (7) and A2 (8), washcoat zone B comprises washcoat zone B1 (9) and washcoat zone B2 (10) whereas washcoat zone C comprises washcoat zone C1 (11) and washcoat zone C2 (12). Washcoat zones A1 (7) and B1 (9) differ only in that B1 (9) comprises a second platinum group metal compared to A1 (7). Likewise, washcoat zones A2 (8) and B2 (10) differ only in that B2 (10) comprises a second platinum group metal compared to A2 (8).

FIG. 2 illustrates catalyst systems according to the present invention. The upper part shows an inventive catalyst system (13) which comprises an inventive catalyst (1) and a conventional three-way catalyst (15). Both catalysts are arranged so that washcoat zone C (6) is followed by the conventional three-way catalyst (15).

The lower part shows an inventive catalyst system (14) which comprises an inventive catalyst (1) and a conventional three-way catalyst (15). Both catalysts are arranged so that washcoat zone C (6) follows the conventional three-way catalyst (10).

COMPARISON EXAMPLE 1

Figure 1:
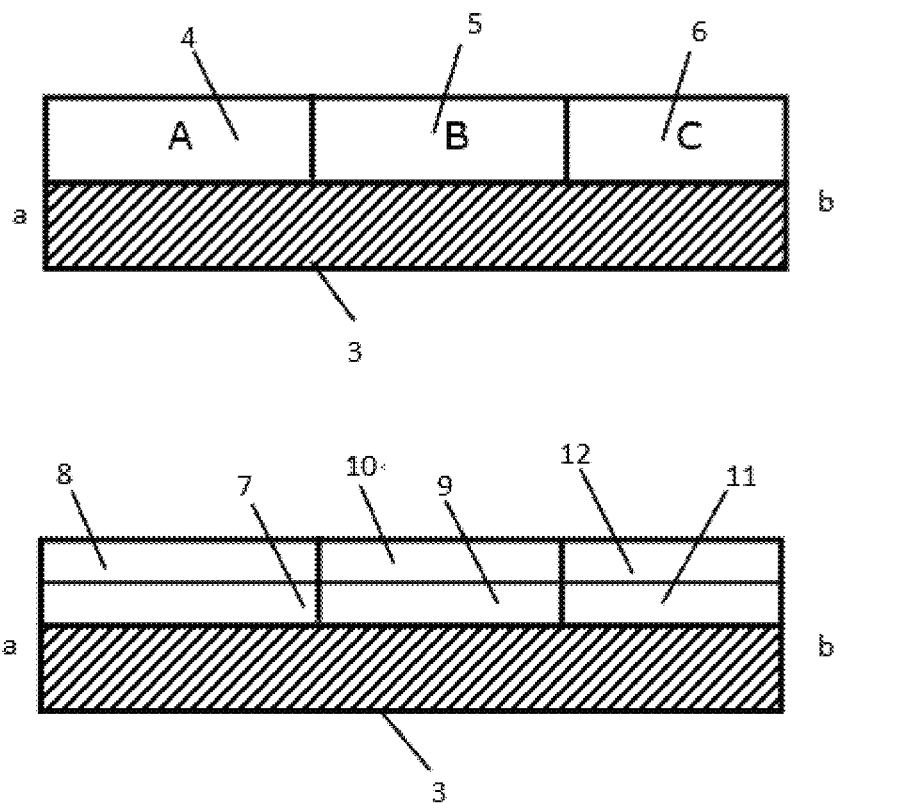
Figure 2:
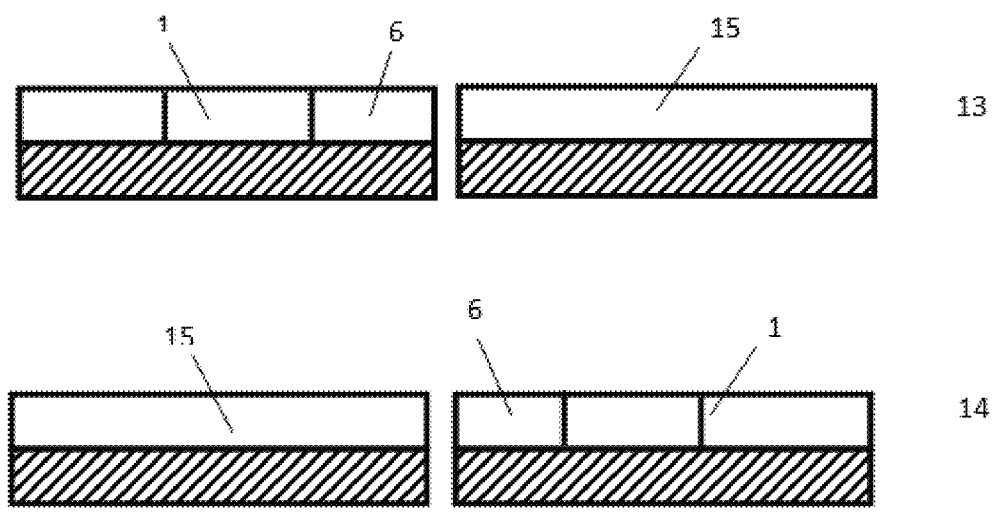

Comparison Example 1 is a 1-Layer Pd/Rh technology that was prepared as follows:

The required amount of water was weighed out and $HNO_3$ added at 0.5 wt % of the final solids content of the slurry to be prepared. A stabilized alumina was then added containing 3 wt % $La_2O_3$ for stabilization followed by an equal amount of a second high porous stabilized alumina containing 4 wt % $La_2O_3$, $BaSO_4$ was then added with stirring followed by lanthanum acetate and finally the OSC material. The OSC material consisted of $CeO_2$=40 wt %, $ZrO_2$+$HfO_2$=50 wt %, $La_2O_3$=5.0 wt % and $Pr_6O_{11}$=5.0 wt %. The slurry was then milled using a Sweco type mill to a mean particle size of 5-7 micrometers, 90% of the diameter distribution was 18-20 micrometers and a 100% pass of less than 45 micrometers (i.e., 100% of the particles had a particle size less than 45 micrometers). The slurry was then weighed and the LOI (loss on ignition) measured at 540° C. to determine the total calcined solids content. Based on this value the Pd and Rh quantities were calculated to give the target loadings based on a final calcined washcoat loading of 2.85 g/in$^3$ or 174 g/L. Rh nitrate was added first dropwise followed by stirring for 15 minutes and then the Pd was added dropwise as Pd nitrate with stirring. After the Pd addition, the slurry specific gravity was adjusted to a range of 1.4 to 1.6 dependent on the washcoat loading target and substrate type to be coated.

Coating was performed by dipping one end of a honeycomb ceramic monolith (commercially available flow through substrate made of cordierite, 3.66" Round×6.0" Long, 400 cpsi, 6.5 mill wall thickness) into the washcoat slurry, followed by drawing the slurry up into the channels using a vacuum. The monolith was then removed from the slurry and the channels cleared by applying a vacuum to its other end. Washcoat loading was controlled by varying specific gravity, and other coating parameters such as vacuum time and the amount of slurry drawn into the honeycomb channels. After applying the washcoat, the monolith was calcined at 540° C. for 2 hours. The final WC loading on a dry calcined basis was stabilized alumina=80 g/L, $BaSO_4$=13 g/L, OSC=80 g/L and $La_2O_3$=1.6 g/L giving a total loading 174 g/L. The washcoat layer was coated over the total length of the monolith. Two samples were built at different PGM loadings, one at a Pd loading of 50 g/ft³ and Rh=3.0 g/ft³ (CC1) and the second at Pd=14 g/ft³ and Rh=1.0 g/ft³ (CC2).

Example 1 (C1)

The PGM banded or zoned catalyst of the current invention was prepared as follows. In the current example the high Pd loaded monolith CC1 of Comparative Example 1 was used with a WC loading of 174 g/L. and a Pd loading of 50 g/ft³. The masking band was applied by dipping one end of the monolith in pure cocoa butter that was heated in a water bath to 50° C. to give a low viscosity fluid that could easily flow into the monolith channels and was injected to a length of 16 mm. Cocoa butter melts at a temperature of 38° C. The excess masking agent in the channels was removed by blowing forced air through the monolith channels from the opposite end of the monolith. The banded part was allowed to sit in air at room temperature for 12 Hrs so the masking agent cooled to room temperature and formed a solid uniform water-impervious layer over the washcoat at the inlet of the part.

Figure 3:
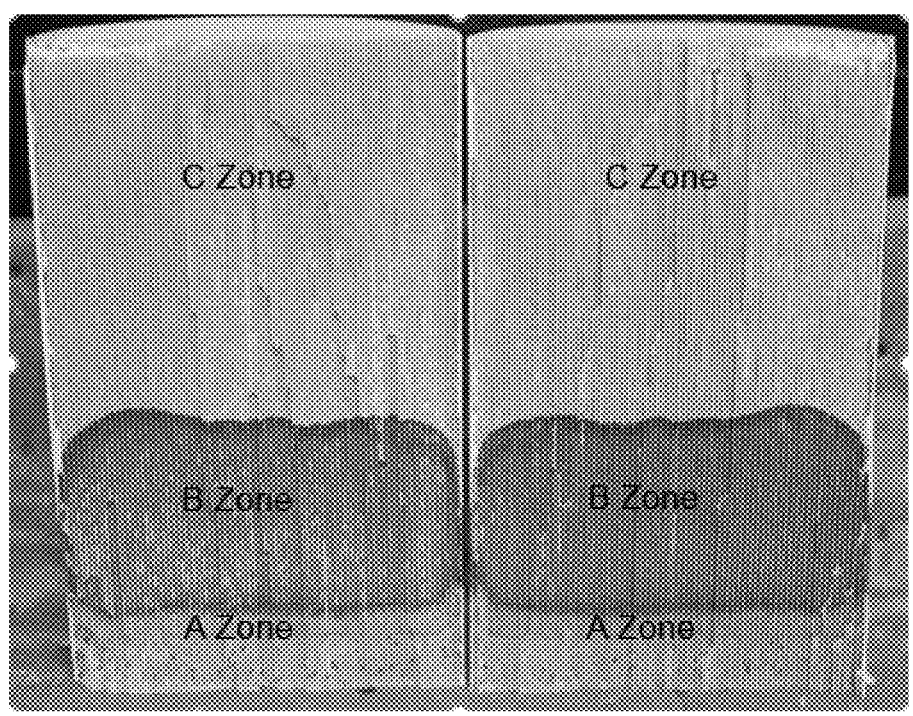
FIG. 3 shows pictures of Catalyst C1 according to Example 1 split open longitudinally. It becomes clear that the washcoat zones A, B and C have been applied as intended.
Figure 4:
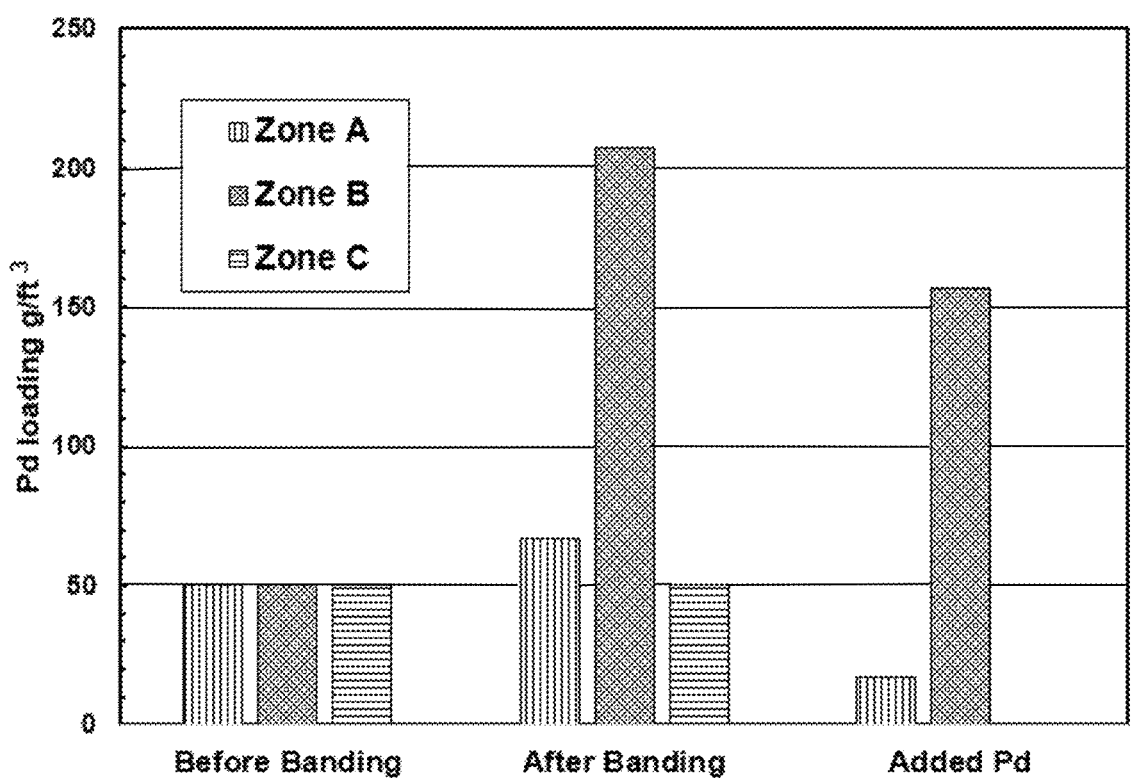
FIG. 4 shows the Pd loadings for the washcoat zones A, B and C of Catalyst C1 according to Example 1 after application of the masking agent and Pd solution dip.

The application of the Pd band or zone was carried out as follows. An aqueous solution consisting of a thickening agent in water was prepared where the thickening agent used was a commercial polysaccharide. This was added to control and limit wicking of the aqueous Pd solution when applied to give the banded zone. The thickening agent was added at 0.5 wt % based on the total weight of solution. Different surfactants can also be used to lower the surface tension of the Pd solution and minimize wicking thus improving control of the Pd band length. To this solution was added Pd tetra-amine acetate at a concentration that was determined based on the Pd loading target in the banded zone, the band/zone length and the amount of solution need to reach the end of the banded zone when injected over the masked zone assuming no solution or Pd uptake. To determine the Pd solution concentration an initial wet weight uptake for the monolith was measured using a solution of the polysaccharide in water without the Pd salt present. In the current example the masked zone length was 16 mm and the target Pd zone/band length was 49 mm. The weight of solution uptake calculated was 73.5 grams with a Pd concentration of 28.5 mg/g of solution. After application of the Pd band, the excess solution was removed by vacuuming from the injection end of the monolith. The banded/zoned part was then calcined in an up-flow forced air oven with the masking band located at the top of the monolith. The calcination temperature was 550° C. for 2 Hrs. After calcination, the part was split open longitudinally to confirm that the bands/zones had been applied as intended. The pictures shown in FIG. 3 confirm that the band/zone was applied as intended. Further, monolith slices were removed from zones A, B and C and the Pd content measured using ICP (Inductively Coupled Plasma) analysis and the data is presented in FIG. 4 as g/ft³ Pd for each zone. From the Pd analysis shown in FIG. 4 it is evident that the high Pd concentration band/zone was successfully applied.

Example 2 (C2)

Figure 5:
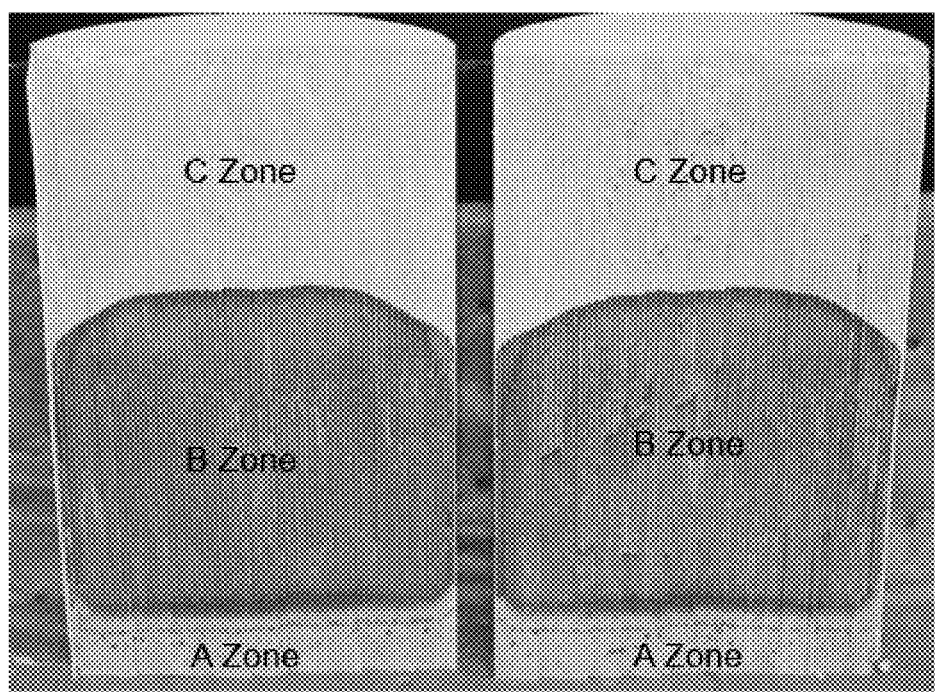
FIG. 5 shows pictures of Catalyst C2 according to Example 2 split open longitudinally. It becomes clear that the washcoat zones A, B and C have been applied as intended.
Figure 6:
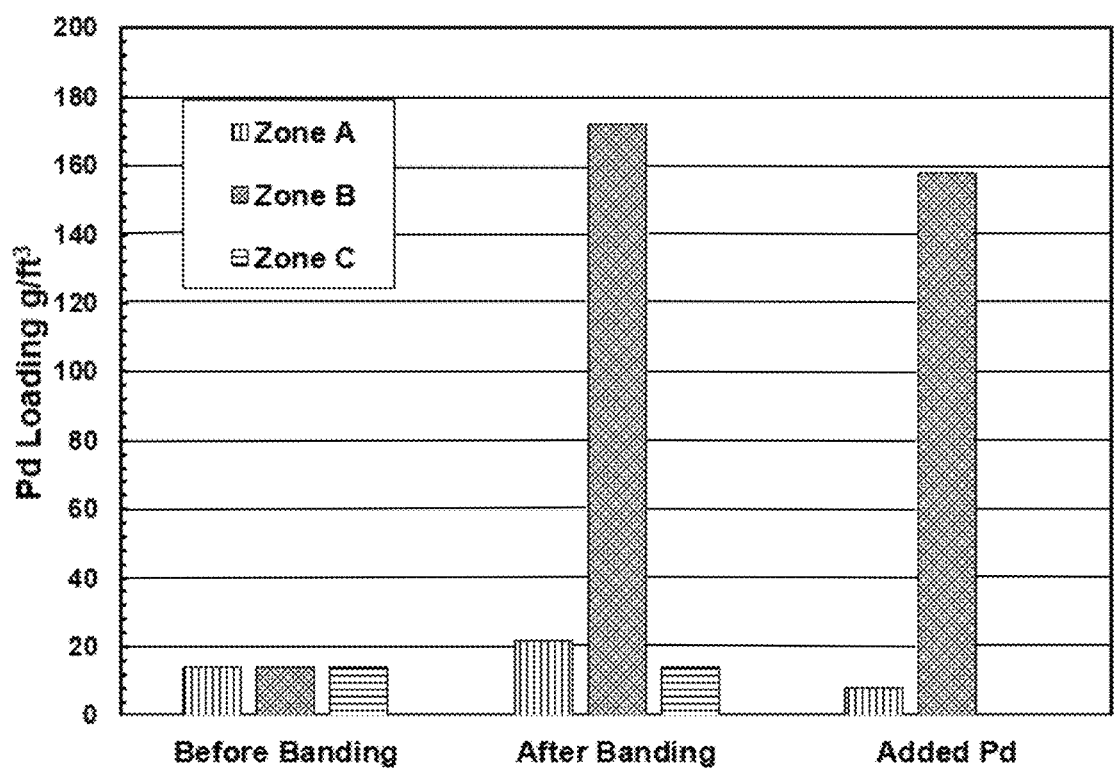
FIG. 6 shows the Pd loadings for the washcoat zones A, B and C of Catalyst C2 according to Example 2 after application of the masking agent and Pd solution dip.

In a second banding experiment the monolith CC2 of Comparative Example 1 with the lower loading of Pd (Pd=14 g/ft³) was banded as described in Example 1. In this case the target Pd zone length was 74 mm with a front masked zone of 16 mm as in Example 1. The calculated solution uptake was 112.9 grams with a Pd concentration of 28.5 mg/g. After calcination, the part was split in half longitudinally and the resultant visualization of the bands are shown in FIG. 5 confirming that the intended banding was achieved. In FIG. 6 is shown the results for Pd loading after ICP analysis of a monolith slice taken from zones A, B and C. It is evident that the Pd band was successfully applied.

The invention claimed is:

1. Catalyst comprising a carrier substrate of length L extending between substrate ends a and b and a full L-length washcoat layer having a first platinum group metal loading along length L, said full L-length washcoat layer having three washcoat zones A, B and C wherein
    washcoat zone A comprises the first platinum group metal loading which has one or more first platinum group metals and extends starting from substrate end a over a part of the length L,
    washcoat zone C comprises the first platinum group metal loading having the one or more first platinum group metals and extends starting from substrate end b over a part of the length L, and
    washcoat zone B comprises the same components as washcoat zone A and in addition one or more second platinum group metals and extends between washcoat zones A and C such that the washcoat zone B has the first platinum group loading plus the one or more second platinum group metals as to make washcoat zone B more catalytically active than washcoat zone A, wherein $L=L_A+L_B+L_C$, wherein $L_A$ is the length of washcoat zone A, $L_B$ is the length of washcoat zone B and $L_C$ is the length of washcoat zone C, and wherein a first exhaust gas contact surface region of the full L-length washcoat layer is continuous and uninterrupted over the full length L.

2. Catalyst according to claim 1, wherein the first and second platinum group metals are different.

3. Catalyst according to claim 1, wherein the first platinum group metal is platinum, palladium and/or rhodium and the second platinum group metal is platinum, palladium or rhodium.

4. Catalyst according to claim 1, wherein the first platinum group metal is palladium and rhodium and the second platinum group metal is palladium.

5. Catalyst according to claim 1, wherein the first platinum group metal is palladium and rhodium and the second platinum group metal is rhodium.

6. Catalyst according to claim 1, wherein the first platinum group metal is palladium and rhodium and the second platinum group metal is platinum.

7. Catalyst according to claim 1, wherein the first and second platinum group metals are independently from each other supported on a carrier material.

8. Catalyst according to claim 7, wherein the carrier material is selected from the group consisting of alumina, silica, magnesia, titania, zirconia, ceria, mixtures comprising at least one of these materials and mixed oxides comprising at least one of these materials.

9. Catalyst according to claim 7, wherein the carrier material for all three washcoat zones A, B and C of the full L-length washcoat layer is of a common composition as well as of a common loading in weight percentage per volume of the substrate.

10. Catalyst according to claim 1, wherein washcoat zone A extends over 15 to 50% of the length L of the carrier substrate, washcoat zone B extends over 7 to 30% of the length L of the carrier substrate and washcoat zone C extends over 20 to 78% of the length L of the carrier substrate.

11. Catalyst according to claim 1, wherein the carrier substrate of the length L is a flow-through or filter substrate.

12. Method for the manufacturing of a catalyst according to claim 1 by a four-step process which comprises.

coating of the carrier substrate with a coating suspension (washcoat) which contains the components of washcoat zone A over its entire length L, applying a hydrophobic masking zone extending from substrate end a over the length $L_A$, dipping the coated carrier substrate in an aqueous solution containing a water-soluble compound of the second platinum group metal starting from substrate end a until the length $L_A+L_B$, so as to form washcoat zone B and drying and heating the coated carrier substrate so as to remove the masking zone.

13. Catalyst system comprising a catalyst according to claim 1 and another three-way catalyst, a gasoline particulate filter, a HC trap and/or a $NO_x$ trap.

14. Catalyst system according to claim 13, wherein substrate end b of the catalyst is followed by a conventional three-way catalyst.

15. Catalyst system according to claim 13, wherein substrate end b of the catalyst follows a conventional three-way catalyst.

16. Method for treating exhaust gases of a combustion engine, wherein the exhaust gas is passed over the catalyst of claim 1, wherein it enters the catalyst at substrate end a and exits it at substrate end b.

17. Method according to claim 16, wherein the catalyst is arranged in close coupled position.

18. Method for treating the exhaust gas of a lean-burn engine, wherein the exhaust gas is passed over the catalyst of claim 1, wherein it enters the catalyst at substrate end a and exits it at substrate end b.

19. Catalyst comprising a carrier substrate of length L extending between substrate ends a and b, and first and second full L-length washcoat layers each having a first platinum group metal loading along length L, said first and second full L-length washcoat layers defining three washcoat zones A, B and C wherein washcoat zone A comprises the first platinum group metal loading associated with each of the first and second full L-length washcoat layers, which first platinum group metal loading has one or more first platinum group metals and extends starting from substrate end a over a part of the length L, washcoat zone C comprises the first platinum group metal loading associated with each of the first and second full L-length washcoat layers and extends starting from substrate end b over a part of the length L, and washcoat zone B comprises the same components as washcoat zone A and in addition one or more second platinum group metals and extends between washcoat zones A and C such that the washcoat zone B has the first platinum group loading associated with each of the first and second full L-length washcoat layers plus the one or more second platinum group metals as to make washcoat zone B more catalytically active than washcoat zone A, wherein $L=L_A+L_B+L_C$, wherein $L_A$ is the length of washcoat zone A, $L_B$ is the length of washcoat zone B and $L_C$ is the length of washcoat zone C, and wherein the second full L-length washcoat layer is arranged as to overly the first full L-length washcoat layer, and wherein the first and second full L-length washcoat layers comprise:

washcoat zone A having two washcoat zones A1 and A2, which both extend over the length $L_A$, wherein washcoat zone A1 comprises one or more first platinum group metals and washcoat zone A2 comprises one or more first platinum group metals different from the one or more first platinum group metals of washcoat zone A1, washcoat zone C having two washcoat zones C1 and C2, which both extend over the length $L_C$, wherein washcoat zone C1 comprises one or more first platinum group metals and washcoat zone C2 comprises one or more first platinum group metals different from the first one or more platinum group metals of washcoat zone C1, and washcoat zone B having two washcoat zones B1 and B2, which both extend over the length $L_B$, wherein washcoat zone B1 comprises the same components as washcoat zone A1 and washcoat zone B2 comprises the same components as washcoat zone A2 and wherein washcoat zones B1 and B2 comprise, in addition to the one or more first platinum group metals, one or more second platinum group metals, and the second full L-length washcoat layer is the first exhaust gas contact surface region relative to the first and second full L-length washcoat layers and is continuous and uninterrupted over the full length L.

20. Catalyst according to claim 19, wherein the first platinum group metal in washcoat zone A1 is palladium and/or rhodium and the first platinum group metal in washcoat zone A2 is rhodium.

21. Catalyst according to claim 19, wherein the first platinum group metal in washcoat zone A1 is palladium and rhodium and the weight ratio Pd:Rh is from 10:1 to 1:10.

\* \* \* \* \*